United States Patent
Kinigakis et al.

(10) Patent No.: US 7,871,697 B2
(45) Date of Patent: Jan. 18, 2011

(54) PEELABLE COMPOSITE THERMOPLASTIC SEALANTS IN PACKAGING FILMS

(75) Inventors: Panagiotis Kinigakis, Roscoe, IL (US);
Kenneth Pokusa, Indian Head Park, IL (US); Gary Albaum, Pleasantville, NY (US); Alexander Jones, Evanston, IL (US); Eric Frederickson, Fox Lake, IL (US)

(73) Assignee: Kraft Foods Global Brands LLC, Northfield, IL (US)

( * ) Notice: Subject to any disclaimer, the term of this patent is extended or adjusted under 35 U.S.C. 154(b) by 0 days.

(21) Appl. No.: 12/031,450

(22) Filed: Feb. 14, 2008

(65) Prior Publication Data

US 2008/0131636 A1   Jun. 5, 2008

Related U.S. Application Data

(63) Continuation-in-part of application No. 11/602,650, filed on Nov. 21, 2006.

(51) Int. Cl.
*B29D 22/00* (2006.01)
*B29D 23/00* (2006.01)
*B32B 5/00* (2006.01)
*B32B 5/16* (2006.01)
*B32B 27/00* (2006.01)
*B32B 27/08* (2006.01)
*B32B 33/00* (2006.01)

(52) U.S. Cl. .................. 428/323; 220/359.1; 428/34.1; 428/35.7; 428/40.1; 428/216; 428/221

(58) Field of Classification Search ............... 428/35.7, 428/34.1, 323, 40.1, 216, 221; 220/359.1
See application file for complete search history.

(56) References Cited

U.S. PATENT DOCUMENTS

| 3,616,898 | A |   | 11/1971 | Massie |
|---|---|---|---|---|
| 3,879,492 | A |   | 4/1975 | Bontinick |
| 3,885,977 | A | * | 5/1975 | Lachman et al. .............. 501/80 |
| 4,058,645 | A |   | 11/1977 | Steiner |
| 4,361,237 | A |   | 11/1982 | Heiremans et al. |
| 4,367,312 | A |   | 1/1983 | Bontinck et al. |
| 4,488,647 | A |   | 12/1984 | Davis |
| 4,512,479 | A |   | 4/1985 | Hain et al. |

(Continued)

FOREIGN PATENT DOCUMENTS

DE    4410235 A1    9/1995

(Continued)

OTHER PUBLICATIONS

European Search Report dated Jan. 14, 2009.

(Continued)

*Primary Examiner*—Brent T O'Hern
(74) *Attorney, Agent, or Firm*—Brooks Kushman P.C.

(57) ABSTRACT

A peelable sealing structure includes a sealing layer and one or more optional additional layers. The peelable sealing structure includes a sealing surface that is formable into a peelable seal upon contact with a sealing substrate at all temperatures in a peelable seal temperature range. Moreover, the peelable sealing structure comprises a thermoplastic polymer and an additive dispersed within at least a portion of the thermoplastic polymer with the peelable sealing structure defining the sealing surface.

9 Claims, 15 Drawing Sheets

U.S. PATENT DOCUMENTS

| | | | |
|---|---|---|---|
| 4,533,509 A | 8/1985 | Gust et al. |
| 4,623,398 A | 11/1986 | Goodman et al. |
| 4,752,342 A | 6/1988 | Tatum et al. |
| 4,771,935 A | 9/1988 | Hekal |
| 4,810,541 A | 3/1989 | Newman et al. |
| 4,970,113 A | 11/1990 | Yamada |
| 5,145,737 A | 9/1992 | Boiron et al. |
| 5,334,643 A | 8/1994 | Gage |
| 5,392,986 A | 2/1995 | Beer et al. |
| 5,437,911 A | 8/1995 | Rohrka et al. |
| 5,449,552 A | 9/1995 | Bochow et al. |
| 5,527,576 A | 6/1996 | Maul et al. |
| 5,626,929 A | 5/1997 | Stevenson |
| 5,634,969 A | 6/1997 | Cody et al. |
| 5,716,698 A | 2/1998 | Schreck et al. |
| 5,739,087 A | 4/1998 | Dennis |
| 5,747,560 A | 5/1998 | Christiani et al. |
| 5,773,136 A | 6/1998 | Alder et al. |
| 5,780,376 A | 7/1998 | Gonzales et al. |
| 5,830,547 A | 11/1998 | MacKenzie et al. |
| 5,912,084 A | 6/1999 | Hausmann et al. |
| 5,958,531 A | 9/1999 | Stevenson |
| 5,997,968 A | 12/1999 | Dries et al. |
| 6,006,913 A | 12/1999 | Ludemann et al. |
| 6,034,163 A | 3/2000 | Barbee et al. |
| 6,036,765 A | 3/2000 | Farrow et al. |
| 6,355,732 B1 | 3/2002 | Beer |
| 6,358,622 B1 | 3/2002 | Shida et al. |
| 6,359,052 B1* | 3/2002 | Trexler et al. ............ 524/445 |
| 6,384,121 B1 | 5/2002 | Barbee et al. |
| 6,417,262 B1 | 7/2002 | Turner et al. |
| 6,423,768 B1 | 7/2002 | Khouri |
| 6,444,742 B1 | 9/2002 | Rong et al. |
| 6,451,426 B2 | 9/2002 | Kong et al. |
| 6,465,543 B1 | 10/2002 | Alexandre et al. |
| 6,521,678 B1 | 2/2003 | Chaiko |
| 6,521,690 B1 | 2/2003 | Ross et al. |
| 6,548,587 B1 | 4/2003 | Bagrodia et al. |
| 6,552,114 B2 | 4/2003 | Turner et al. |
| 6,599,622 B1 | 7/2003 | Chu et al. |
| 6,709,759 B2 | 3/2004 | Mueller et al. |
| 6,723,403 B2 | 4/2004 | Ishii et al. |
| 6,767,951 B2 | 7/2004 | Nair et al. |
| 6,815,025 B2 | 11/2004 | Kawamura et al. |
| 6,838,508 B2 | 1/2005 | Hsiao et al. |
| 6,849,313 B2 | 2/2005 | Mechelaere et al. |
| 6,896,956 B2 | 5/2005 | Kong |
| 6,913,809 B2 | 7/2005 | Wolak |
| 7,135,508 B2 | 11/2006 | Chaiko et al. |
| 7,141,293 B2 | 11/2006 | Peiffer et al. |
| 7,157,516 B2 | 1/2007 | Chaiko |
| 7,166,656 B2 | 1/2007 | Majumdar et al. |
| 7,186,452 B2 | 3/2007 | Peiffer et al. |
| 7,205,040 B2 | 4/2007 | Peiffer et al. |
| 7,211,306 B2 | 5/2007 | Peiffer et al. |
| 7,267,858 B2 | 9/2007 | Ono et al. |
| 7,329,453 B2 | 2/2008 | Peiffer et al. |
| 7,354,635 B2 | 4/2008 | Malfait et al. |
| 7,368,165 B2 | 5/2008 | Sankey et al. |
| 7,368,496 B2 | 5/2008 | Kim et al. |
| 7,371,793 B2 | 5/2008 | Gong et al. |
| 7,393,581 B2 | 7/2008 | Kim et al. |
| 7,396,578 B2 | 7/2008 | Peiffer et al. |
| 7,413,800 B2 | 8/2008 | Wood, Jr. et al. |
| 2001/0012557 A1 | 8/2001 | Willham et al. |
| 2001/0035593 A1 | 11/2001 | Peiffer et al. |
| 2002/0009563 A1 | 1/2002 | Kawamura et al. |
| 2002/0122977 A1 | 9/2002 | Fujimatsu et al. |
| 2002/0165306 A1 | 11/2002 | Gilmer et al. |
| 2003/0152735 A1 | 8/2003 | Koike |
| 2003/0219585 A1 | 11/2003 | Yamanaka et al. |
| 2004/0067284 A1 | 4/2004 | Sankey et al. |
| 2005/0042468 A1 | 2/2005 | Peiffer et al. |
| 2005/0074619 A1 | 4/2005 | Peiffer et al. |
| 2005/0121822 A1 | 6/2005 | Peiffer et al. |
| 2005/0208282 A1* | 9/2005 | Wood et al. ............ 428/216 |
| 2005/0249906 A1 | 11/2005 | Sankey et al. |
| 2005/0266257 A1 | 12/2005 | Lee et al. |
| 2005/0276940 A1 | 12/2005 | Stevenson |
| 2005/0282948 A1 | 12/2005 | Li et al. |
| 2006/0046595 A1 | 3/2006 | Imaizumi et al. |
| 2006/0094810 A1 | 5/2006 | Kim et al. |
| 2006/0094811 A1 | 5/2006 | Kim et al. |
| 2006/0111499 A1 | 5/2006 | Kim et al. |
| 2006/0121224 A1 | 6/2006 | Kim et al. |
| 2006/0122311 A1 | 6/2006 | Kim et al. |
| 2006/0122312 A1 | 6/2006 | Kim et al. |
| 2006/0128867 A1 | 6/2006 | Marx et al. |
| 2006/0141183 A1 | 6/2006 | Williamson et al. |
| 2006/0141241 A1 | 6/2006 | Carespodi et al. |
| 2006/0172098 A1 | 8/2006 | Stevenson |
| 2006/0199890 A1 | 9/2006 | Fasulo et al. |
| 2006/0211804 A1 | 9/2006 | Kim et al. |
| 2006/0222797 A1 | 10/2006 | Bekele |
| 2006/0240204 A1 | 10/2006 | Ling et al. |
| 2006/0269707 A1 | 11/2006 | Berbert |
| 2007/0078212 A1 | 4/2007 | Kim et al. |
| 2007/0104395 A1 | 5/2007 | Kinigakis et al. |
| 2007/0199481 A1 | 8/2007 | Roelofs |
| 2007/0267737 A1 | 11/2007 | Chen et al. |
| 2008/0176980 A1 | 7/2008 | Torkelson et al. |
| 2008/0255296 A1 | 10/2008 | Gibbons et al. |
| 2009/0036580 A1 | 2/2009 | Qian et al. |
| 2010/0092793 A1* | 4/2010 | Aithani et al. ............ 428/483 |

FOREIGN PATENT DOCUMENTS

| | | |
|---|---|---|
| EP | 0684970 B1 | 12/1994 |
| EP | 1080881 A2 | 3/2001 |
| EP | 0772553 B1 | 4/2001 |
| EP | 1177245 A1 | 2/2002 |
| EP | 1344642 A2 | 9/2003 |
| EP | 1 356 925 A | 10/2003 |
| EP | 1144494 B1 | 7/2004 |
| EP | 0848726 B1 | 9/2004 |
| EP | 1475229 A2 | 11/2004 |
| EP | 1496085 A1 | 1/2005 |
| EP | 1591236 A2 | 2/2005 |
| EP | 1529799 A1 | 5/2005 |
| EP | 1785447 B1 | 10/2006 |
| FR | 2769867 B1 | 12/1999 |
| JP | 10146931 A | 6/1998 |
| JP | 11035907 A | 2/1999 |
| JP | 2000198170 A2 | 7/2000 |
| WO | 9748554 A1 | 12/1997 |
| WO | 9952972 A1 | 10/1999 |
| WO | 9952972 C2 | 10/1999 |
| WO | 0039200 A1 | 7/2000 |
| WO | 03011961 A1 | 2/2003 |
| WO | 03035391 A2 | 5/2003 |
| WO | 03040199 A1 | 5/2003 |
| WO | 03091020 A1 | 11/2003 |
| WO | 2004/080808 A | 9/2004 |
| WO | 2005040268 A1 | 5/2005 |
| WO | 2005056644 A2 | 6/2005 |
| WO | 2005116132 A1 | 12/2005 |
| WO | 2006045896 A1 | 5/2006 |
| WO | 2006058952 A1 | 6/2006 |
| WO | 2006071833 A1 | 7/2006 |
| WO | 2007012805 A1 | 2/2007 |
| WO | 2007019142 A1 | 2/2007 |
| WO | 2007090605 A1 | 8/2007 |
| WO | 2007093798 A1 | 8/2007 |
| WO | 2007106671 A1 | 9/2007 |

| | | | |
|---|---|---|---|
| WO | 2007/115310 | A2 | 10/2007 |
| WO | 2007121048 | A1 | 10/2007 |
| WO | 2007121049 | A1 | 10/2007 |
| WO | 2007123582 | A2 | 11/2007 |
| WO | 2007130755 | A1 | 11/2007 |
| WO | 2007146390 | A2 | 12/2007 |
| WO | 2008043750 | A1 | 4/2008 |
| WO | 2008053205 | A1 | 5/2008 |
| WO | 2008127485 | A1 | 10/2008 |

OTHER PUBLICATIONS

English Abstract corresponding to FR2769867.
English Abstract corresponding to EP1785447.
English Abstract corresponding to DE4410235.
English Abstract corresponding to EP 1475229.
English Abstract corresponding to EP 1529799.
International Search Report dated Mar. 25, 2009, 3 pages.

* cited by examiner

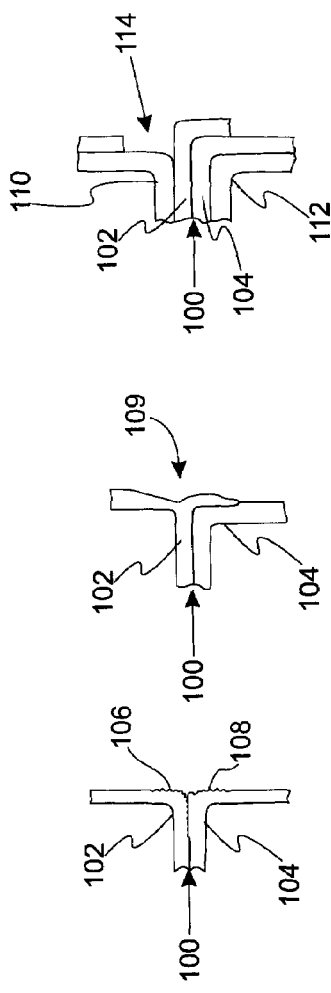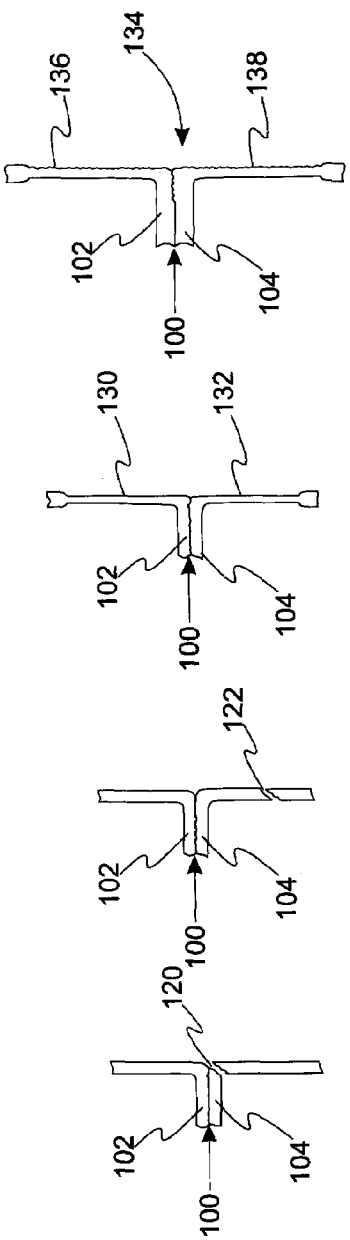

150

152

150  154

152

150  156

154

152

Table 6. Seal Strength and failure types for various seals -25.4 mm seals

| NO | Material | | 110°C | | 115°C | | 120°C | | 125°C | |
|---|---|---|---|---|---|---|---|---|---|---|
| | Heated Side | Unheated Side | Seal Strength (N/cm) | Fail Type | Seal Strength (N/cm) | Fail type | Seal Strength (N/cm) | Fail Type | Seal Strength (N/cm) | Fail Type |
| 1 | PE/EVA | PE/EVA | 3±1 | Adhesive-seal(A) | 4±1 | Adhesive-seal(A) | 8±1 | Adhesive(A) +Delam(C) | 8±1 | Adhesive(A) +Delam(C) |
| 2 | PE/EVA | PE/clay | 0 | No Seal | 2±0 | Adhesive-seal(A) | 2±0 | Adhesive-seal(A) | 6±1 | Adhesive(A)+ mater break-(D) |
| 3 | PE/EVA | PE | 0 | No Seal | 1±0 | Adhesive-seal(A) | 3±0 | Adhesive-seal(A) | 5±1 | Adhesive-seal(A) |
| 4 | PE/clay | PE/clay | 0 | No Seal | 1±0 | Adhesive-seal(A) | 6±0 | Adhesive-seal(A) | 8±1 | Adhesive(A) + seal break-elong (G) |
| 5 | PE | PE/clay | 0 | No Seal | 1±0 | Adhesive-seal(A) | 5±1 | Adhesive-seal(A) | 7±2 | Adhesive (A)+ (peel - elong) (G) |
| 6 | PE/EVA/clay | PE/EVA/clay | 3±0 | Adhesive-seal(A) | 4±0 | Adhesive-seal(A) | 4±0 | Adhesive-seal(A) | 4±0 | Adhesive-seal(A) |
| 7 | PE/EVA/clay | PE/EVA | 2±0 | Adhesive-seal(A) | — | — | 2±0 | Adhesive-seal(A) | 2±0 | Adhesive-seal(A) |
| 8 | PE/EVA/clay | PE/clay | 4±1 | Adhesive-seal(A) | — | — | 4±0 | Adhesive-seal(A) | 4±0 | Adhesive-seal(A) |
| 9 | PE/EVA/clay | PE | 2±0 | Adhesive-seal(A) | — | — | 2±1 | Adhesive-seal(A) | 3±0 | Adhesive-seal(A) |
| 10 | PE/EVA/clay | HDPE | 3±0 | Adhesive-seal(A) | — | — | 4±0 | Adhesive-seal(A) | 3±0 | Adhesive-seal(A) |
| 11 | PE | PE | 0 | No Seal | 0 | No Seal | 0 | No Seal | 11±0 | Mater.elong (F) |

Legend: No Seal | Peelable | Fused

Fig. 13A

Table 6. Continued.

| NO | Material | | Seal Strength (N/cm) 130°C | Fail Type 130°C | Seal Strength (N/cm) 135°C | Fail Type 135°C | Seal Strength (N/cm) 140°C | Fail Type 140°C | Seal Strength (N/cm) 145°C | Fail Type 145°C |
|----|----------|----------|---|---|---|---|---|---|---|---|
| | Heated Side | Unheated Side | | | | | | | | |
| 1 | PE/EVA | PE/EVA | 9±1 | Peelable(A)+ Delamination(C) | 12±2 | (Peel+elong)(G) | 12±2 | Break (D) | --- | --- |
| 2 | PE/EVA | PE/clay | 8±0 | (Peel+elong)(G) | 9±0 | Break(D)+ Mater.elong(F) | 8±1 | Break(D)+ Mater.elong(F) | --- | --- |
| 3 | PE/EVA | PE | 9±2 | (Peel+elong)(G) | 11±0 | (Peel+elong)(G) | 7±1 | Break (D) | --- | --- |
| 4 | PE/clay | PE/clay | 9±0 | Break (D)+ Mater.elong(F) | 8±1 | Break (D) | 9±0 | Break (D) | --- | --- |
| 5 | PE | PE/clay | 10±1 | (Peel+elong)(G) | 9±1 | Break (D)+ (Peel+elong)(G) | 10±1 | Break (D) | --- | --- |
| 6 | PE/EVA/clay | PE/EVA | 4±0 | Adhesive-seal(A) | 4±0 | Adhesive-seal(A) | 15±3 | Break (D) | 13±1 | Break (D) |
| 7 | PE/EVA/clay | PE/clay | 2±0 | Adhesive-seal(A) | 2±0 | Adhesive-seal(A) | 6±1 | Adhesive-seal(A) | 6−0 | Break (D) |
| 8 | PE/EVA/clay | PE/clay | 4±0 | Adhesive-seal(A) | 5±1 | Break (D) | 8±0 | Break (D) | 9±1 | Break (D)+ Mater.elong(F) |
| 9 | PE/EVA/clay | PE | 3±1 | Adhesive-seal(A) | 4±1 | Adhesive-seal(A) | 11±0 | Break (D) | 11±1 | Break (D) |
| 10 | PE/EVA/clay | HDPE | 4±0 | Adhesive-seal(A) | 3±0 | Adhesive-seal(A) | 4±0 | Adhesive-seal(A) | 11±1 | Break (D) |
| 11 | PE | PE | >14±0 | Mater.elong (F) | >13±1 | Mater.elong (F) | >15±1 | Break (D)+ Elongation (F) | 12±1 | Break (D)+ Mater.elong(F) |

*Underlined strengths denote material failure away from the seal and do not correspond to seal strength Legend: ▨ No Seal   ▨ Peelable   ▨ Fused

PEELABLE COMPOSITE THERMOPLASTIC SEALANTS IN PACKAGING FILMS

CROSS-REFERENCE TO RELATED APPLICATIONS

This application is a continuation-in-part of U.S. application Ser. No. 11/602,650 filed Nov. 21, 2006, the entire disclosure of which is hereby incorporated by reference.

BACKGROUND OF THE INVENTION

1. Field of the Invention

The present invention relates to package systems that include a peelable seal, and in particular, the present invention relates to compositions and methods for forming such peelable seals.

2. Background Art

Packaging is an important feature in selling and marketing most products. Food products, in particular, have rather stringent packaging requirements in order to preserve freshness and enhance shelf life. Certain medical devices also present strict packaging requirements in order to preserve sterility of such devices. In such applications, the package is typically vacuum-packed or gas-flushed and subsequently hermetically sealed. Although efficient packaging of products is mandatory, various aesthetic properties of a product package are also important. For example, the appearance of a product is important in appealing to consumers. Moreover, in many applications and, in particular, for food products reusability and ease of opening of a package are also important considerations. In many applications, the ability to easily open a package will depend on the mechanical properties of the seal.

One particularly important packaging structure utilizes a peelable seal. In at least one prior art packaging system, a peelable seal is formed by coating a heat sealable polymeric material onto a metal foil. Since packaging incorporating such seals are often impervious to air and contaminants, peelable seals must also be impervious to these materials. When a package having a peelable seal is opened, a sealing layer may be peeled away from a substrate. It is desirable for such peeling to be achievable with a low and relatively constant peel force. The elastic properties of the peelable seal are such that failure of the seal does not occur from flexing and normal handling of the package. In some prior art packaging, peelable seals are constructed from multi-layered sheets. Examples of packaging systems having such seals include tray-type food packages, bottles or blister packages, and the like. Although some of the prior art peelable sealing packages work reasonably well, it has been difficult to construct packaging systems that consistently form hermetic seals that resist leaking while being easily opened by an end user. Moreover, such prior art peelable packaging systems tend to operate over relatively narrow ranges, and in particular narrow temperature ranges. Narrow sealing temperature ranges tend to result in packaging defects. For example, on the low end of the usable temperature range leaking seals may be formed (not hermetically sealed). On the high end of the usable temperature range, non-peelable seal are formed which tear when opened.

Accordingly, there exists a need for improved peelable packaging systems that resist leaking, provide a hermetic seal, and open easily.

SUMMARY OF THE INVENTION

The present invention solves one or more problems of the prior art by providing in at least one embodiment a peelable sealing structure. The peelable sealing structure of this embodiment advantageously includes a sealing surface that is formable into a peelable seal upon contact with a sealing substrate at all temperatures in a peelable seal temperature range. Moreover, the peelable sealing structure of this embodiment comprises a thermoplastic polymer, and an additive dispersed within at least a portion of the thermoplastic polymer.

In another embodiment of the present invention, a peelable sealing structure is useful for forming a peelable seal at the opening of a container. The peelable sealing structure of this embodiment comprises a sealing layer and one or more optional additional layers. Advantageously, the sealing layer includes a functionalized organoclay dispersed with a thermoplastic polymer. The incorporation of functionalized organoclay particles within commonly used heat sealable thermoplastic polymers is found to provide a consistent peel strength over a broad range of heat sealing conditions. Moreover, the blend of commercially available organoclay polymer concentrates with a wide range of polyolefin sealant resins advantageously exhibits a peel strength inversely proportional to the percent load of organoclay. Although sealed interfaces utilizing the sealing layer peels in a consistent pattern, the hermetic integrity of the seal is not compromised even when the seal specimens include wrinkles, pleats and gusset configurations in various bag/pouch package styles.

In another embodiment of the present invention, a packaging system incorporating the peelable sealing structures of the invention is provided. The packaging system of the invention includes a container section and a peelable sealing section attached to the container section. The sealing section includes the sealing layer of the invention set forth above.

BRIEF DESCRIPTION OF THE DRAWINGS

FIG. 1A is a schematic illustration of an Adhesive Type A failure;

FIG. 1B is a schematic illustration of an Adhesive Type B failure;

FIG. 1C is a schematic illustration of a Delamination Type C failure;

FIG. 1D is a schematic illustration of a Break Type D failure;

FIG. 1E is a schematic illustration of a Break Type E failure;

FIG. 1F is a schematic illustration of an Elongation Type F failure;

FIG. 1G is a schematic illustration of a Peel+Elongation Type G failure;

FIG. 13A provides Table 6 which summarizes the seal strength data for FIGS. 12A and 12B; and FIG. 13B is a continuation of FIG. 13A;

DETAILED DESCRIPTION OF THE PREFERRED EMBODIMENT(S)

Figure 2A:
FIG. 2A is a schematic cross-section of a single layer sealing structure.

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary, percent, "parts of," and ratio values are by weight; the term "polymer" includes "oligomer," "copolymer," "terpolymer," and the like; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a", "an", and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application in their entirety to more fully describe the state of the art to which this invention pertains.

The term "organoclay" as used herein means organically modified clay. Typically, such modification renders a clay more compatible and therefore mixable with polymers.

The term "roughness average" ("$R_a$") as used herein means the mean height of a surface as calculated over the entire measured length or area in accordance with ANSI B46.1. It is usually provided in micrometers or micro-inches.

The term "peelable seal" as used herein means a seal that has a peel force of between 0.5 lbs per one inch of sample width and a force that tears the seal. Typically, the upper limit is less than or equal to 5 lbs per inch of sample width. In other variation, the upper limit is less than or equal to 4 lbs per inch of sample width or less than the tear strength on the film substrate.

The term "peel force" as used herein means force to separate two layers as defined in ASTM F-88 which is incorporated by references. For example, this is the force necessary to separate two layers of one inch width by pulling.

The term "seal initiation temperature" as used herein refers to the lowest temperature at which a seal is formed with a peel force of 0.5 lbs. per inch. Specifically, the seal initiation temperature is the temperature of a surface (typically metal) contacting a layer or layers that are to be sealed thereby promoting such sealing. In some variations, the surface contacts the layer(s) with a dwell time from about 0.5 to 1 seconds with a pressure from 5 psi to 1200 psi.

The term "peelable seal temperature range" means the range of temperatures at which a seal between two materials is formed such that the peel force is between 0.5 lbs per one inch of sample width and a force that tears the seal as set forth above.

With reference to FIGS. 1A-1G, schematic illustrations are provided illustrating various seal failure mechanisms. In each variation of these figures, seal 100 is formed from contact of a section of first sealing layer 102 with a section of second sealing layer 104 to form a seal. FIG. 1A illustrates the behavior of a peelable seal in accordance with one or more embodiments of the present invention. When a seal between layers 102 and 104 is subjected to a force that acts to pull these layers apart, layers 102, 104 separate relatively cleanly at separation surfaces 106, 108. This seal failure is referred to as an Adhesive Type A failure. FIG. 1B illustrates a seal in which the structure integrity of layer 102 fails when the seal is stressed forming tear 109. This seal failure is referred to as an Adhesive Type B failure. FIG. 1C illustrates a seal which includes additional layers to form a multilayer laminate structure. Layer 110 is attached to layer 102 while layer 104 is attached to layer 112. The mode of failure illustrated in FIG. 1C is delamination at position 114. This seal failure is referred to as a Delamination Type C failure. FIG. 1D illustrates a material failure in which layer 104 breaks at position 120 close to a region in which layers 102, 104 are still adhered to one another. This seal failure is referred to as a Break Type D failure. FIG. 1E illustrates a material failure in which layer 104 breaks at position 122 remote from a region in which layers 102, 104 are still adhered to one another. This seal failure is referred to as a Break Type E failure. FIG. 1F illustrates a material failure in which layers 102 and 104 stretch at sections 130, 132 that is not incorporated in seal 100. This seal failure is referred to as an Elongation Type F failure. Finally, FIG. 1G illustrates a material failure in which layers 102 104 separate at seal 100 by a peeling mechanism with a concurrent stretching at sections 136, 138. This seal failure is referred to as a Peel+Elongation Type G failure. Embodiments of the present invention advantageously form peelable seals that fail via the Adhesive Type A failure mechanism.

In all embodiment of the present invention, a peelable sealing structure is provided. The peelable scaling structure of this embodiment comprises a thermoplastic polymer and an additive dispersed within at least a portion of the thermoplastic polymer. The peelable sealing structure defines a sealing surface that is formable into a peelable seal at all temperatures within a peelable seal temperature range. In a variation of this embodiment, the peelable seal temperature range is from a seal initiation temperature to a temperature that is that is at least 50° F. degrees above the seal initiation temperature. In another embodiment of the present invention, the peelable seal temperature range is from a seal initiation temperature to a temperature that is that is at least 75° F. degrees above the seal initiation temperature. In still another embodiment of the present invention, the peelable seal temperature range is from a seal initiation temperature to a temperature that is at least 100 F. degrees above the seal initiation temperature. Typically, for packaging applications the seal initiation temperature ranges from about 170° F. to about 350° F. In another variation, for packaging applications the seal initiation temperature ranges from about 170° F. to about 250° F.

Figure 2B:
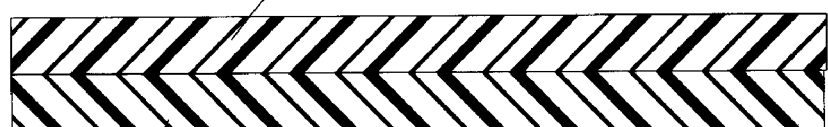
FIG. 2B is a schematic cross-section of a two layer sealing section.
Figure 2C:
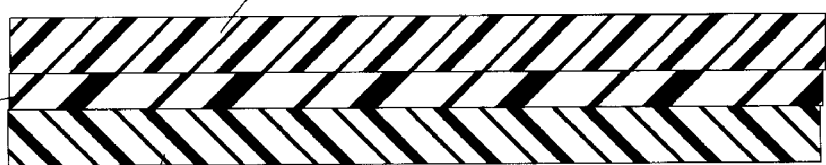
FIG. 2C is a schematic cross-section of a three layer sealing layer.

With reference to FIGS. 2A, 2B, and 2C, illustrations of a peelable sealing structure used in the packaging systems of the present invention is provided. In this embodiment, the peelable sealing structure is attached to a substrate to form a peelable seal or sealing section. FIG. 2A is a schematic cross-section of a single layer sealing structure. In this variation, peelable sealing structure 150 includes sealing layer 152. FIG. 2B is a schematic cross-section of a two layer sealing structure. Peelable sealing structure 150 includes sealing layer 152 and additional layer 154. FIG. 2C is a schematic cross-section of a three layer sealing layer. In this variation, peelable sealing structure 150 includes sealing layer 152 and additional layers 154, 156.

It should be appreciated that in each of the variations of FIGS. 2A, 2B and 2C, sealing layer 152 comprises a thermoplastic polymer, and an additive dispersed within the thermoplastic polymer. In a variation of the present embodiments, useful additives have a surface area greater than 100 m$^2$/gram and an aspect ratio greater than 10. Additionally, useful additions are crystalline or polycrystalline. Examples of useful additives include, but arc not limited to, organoclays. Sealing layer 152 is adapted to contact a substrate section of a container to form a peelable seal. Such containers may be of virtually any shape that is useful to package an object. Examples of such shapes include, but are not limited to, blisters, trays, bags, pouches, and combinations thereof.

It has surprisingly been discovered that sealing layers formed from this composition have improved and uniform peel performance as described more completely below. Scaled interfaces utilizing peelable sealing structure 150 peel in a consistent pattern, the hermetic integrity of the seal is not compromised even when the film specimens include wrinkles, pleats and gusset configurations in various bag/pouch package styles. Peelable sealing structure 150 exhibits a consistent peelable behavior in the following combinations: 1) sealing layer 152 contacting another sealing layer of analogous or the same composition; 2) sealing layer 152 contacting a structure formed from neat sealant (e.g. organoclay/polyethylene layer against a neat polypropylene layer, organoclay/polyethylene layer against neat polyester layer, organoclay/polyethylene layer against a neat polyethylene layer). Processing aids such as antiblocking agents, antioxidants, slip additives, and the like are optionally included into the sealing layers and do not affect the peel pattern of sealing structure 150.

Additional layers 154, 156 are used to provide a number of useful features to the present embodiment. For example, additional layers 154, 156 may provide structural support, heat resistance, barrier properties, and improved appearance to packaging systems that incorporate peelable sealing sections. It should also be appreciated that the present embodiment encompasses, in addition to single layer peelable sealing structures, multilayer structures having any number of additional layers. In each variation of the present embodiment, the multilayer sealing structures include peelable sealing having the compositions described herein.

Sealing layer 152 is further characterized by various physical and structure variations and refinements which depend to some extent on the specific packaging desired. In one variation of the present embodiment, sealing layer 152 has a thickness from about 6 microns to about 120 microns. In another variation of the present embodiment, scaling layer 152 has a thickness from about 6 microns to about 30 microns. In still another variation of the present embodiment, sealing layer 152 has a thickness from about 40 microns to about 120 microns. Sealing layer 152 is further distinguished from analogous layers formed without or with insufficient amounts of organoclay in having a higher degree of surface roughness. In one refinement, sealing layer 152 has a surface roughness characterized by a roughness average from about 1500 to about 5000 angstroms. In another refinement, sealing layer 152 has a surface roughness characterized by a roughness average from about 2000 to about 4000 angstroms. It should be readily appreciated that in variations of the present invention, the degree and the quality of the surface roughness depends both on the methods and process parameters used to form sealing layer 152. The sealing layers of various embodiments also exhibit somewhat higher tensile moduli than analogous layers without organoclay. In one refinement, the sealing layer 152 has a tensile modulus from about 500 to about 2000 MPa.

Figure 3A:
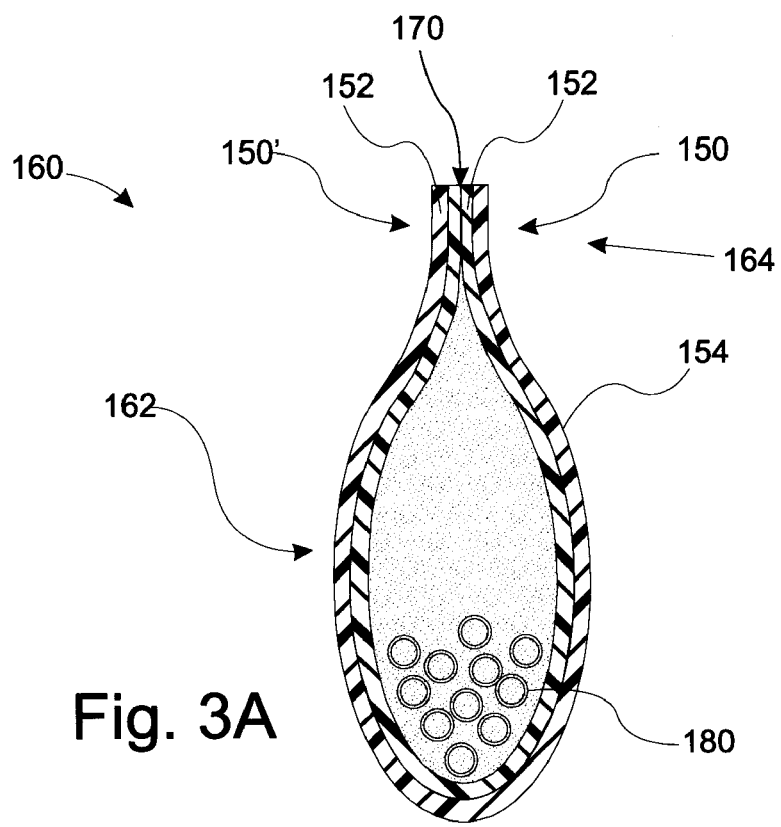
FIG. 3A is a schematic cross-section of a pouch-like packaging system incorporating an embodiment of the peelable sealing structure of the invention.
Figure 3B:
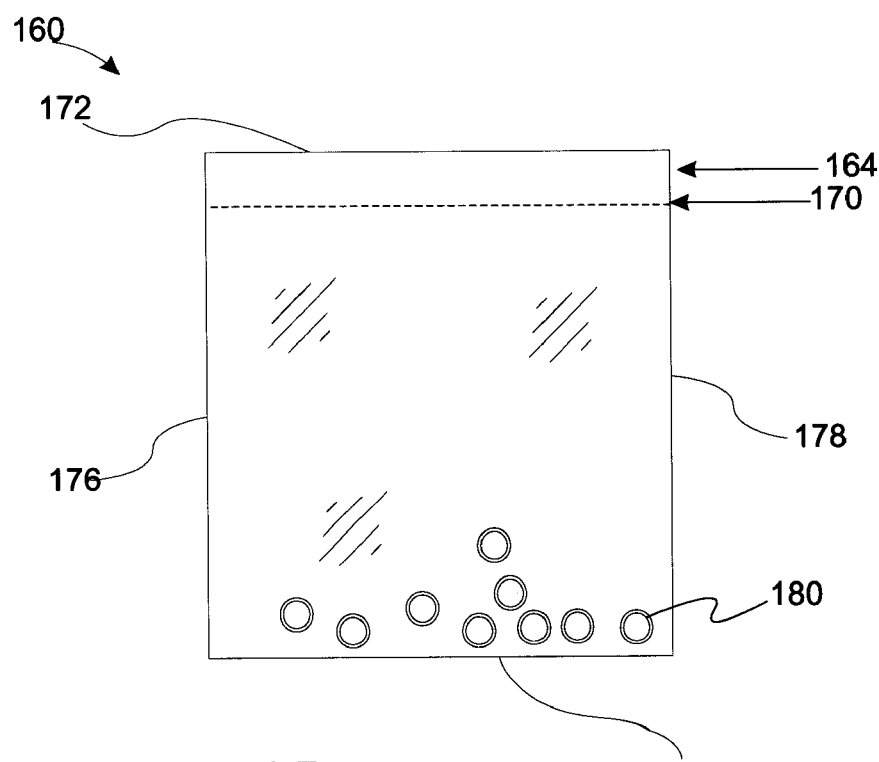
FIG. 3B is a side view of the pouch-like packaging system of FIG. 3A.

With reference to FIGS. 3A and 3B, a packaging system incorporating the peelable sealing structures set forth above is described. FIG. 3A is a cross-section of a pouch-like packaging system incorporating an embodiment of the peelable sealing structure of the invention. FIG. 3B is a side view of a pouch-like packaging system incorporating an embodiment of the peelable sealing structure of the invention. Packaging system 160 includes container section 162 and peelable sealing section 164. Peelable sealing section 164 is attached to container section 162. FIG. 3A depicts an example in which peelable sealing section 164 and container section 162 are continuous, each being formed from the same multilayer structure (i.e., sheet). Container section 162 can have virtually any shape that is useful for packaging an object in a pouch. Sealing section 164 includes peelable sealing structure 150. In the variation depicted in FIG. 3A, peelable sealing structure 150 includes sealing layer 152 disposed on additional layer 154. As set forth above in connection with the descriptions of FIGS. 2A, 2B, and 2C, sealing layer 152 comprises a thermoplastic polymer and an additive such as an organoclay dispersed within the thermoplastic polymer.

Still referring to FIGS. 3A and 3B, packaging system 160 further includes a second sealing structure 150' contacting peelable sealing structure 150 to form peelable seal 170. Seal 170 seals an opening at top side 172 of packaging system 160. Similar peelable seals are optionally positioned at bottom side 174, left side 176, and right side 178. Peelable sealing structure 150' also includes sealing layer 152 disposed on additional layer 154. Specifically, a first portion of the combination of sealing layer 152 disposed on additional layer 154 forms sealing structure 150 while a second portion of the combination of sealing layer 152 disposed on additional layer 154 forms sealing structure 150'. Sealing structures 150, 150' are continuous with container section 162. In a variation of the present embodiment, a third portion of the combination of sealing layer 152 disposed on additional layer 154 at least partially forms container section 162. Advantageously, packaging system 160 is adapted to contain object(s) 180 (i.e., may be one or more objects). Examples of object(s) 180 that may be packaged include, but are not limited to, food products and sterilized objects (e.g., medical devices).

Figure 4A:
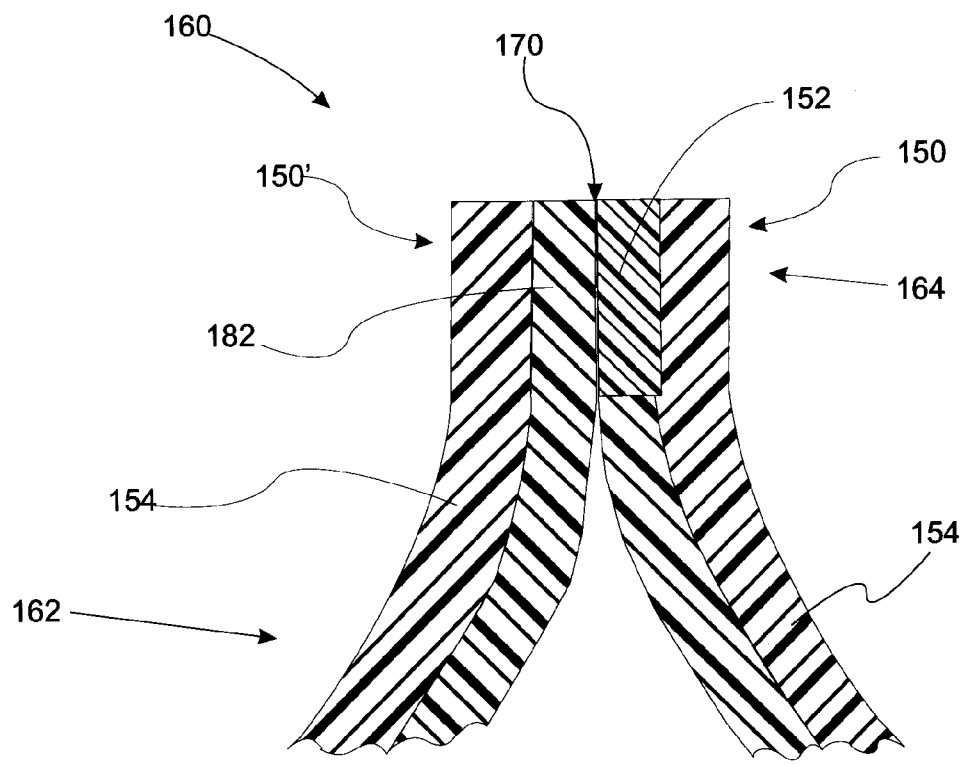
FIG. 4A is a schematic cross-section of a refinement in which a sealing substrate includes a second sealing layer.
Figure 4B:
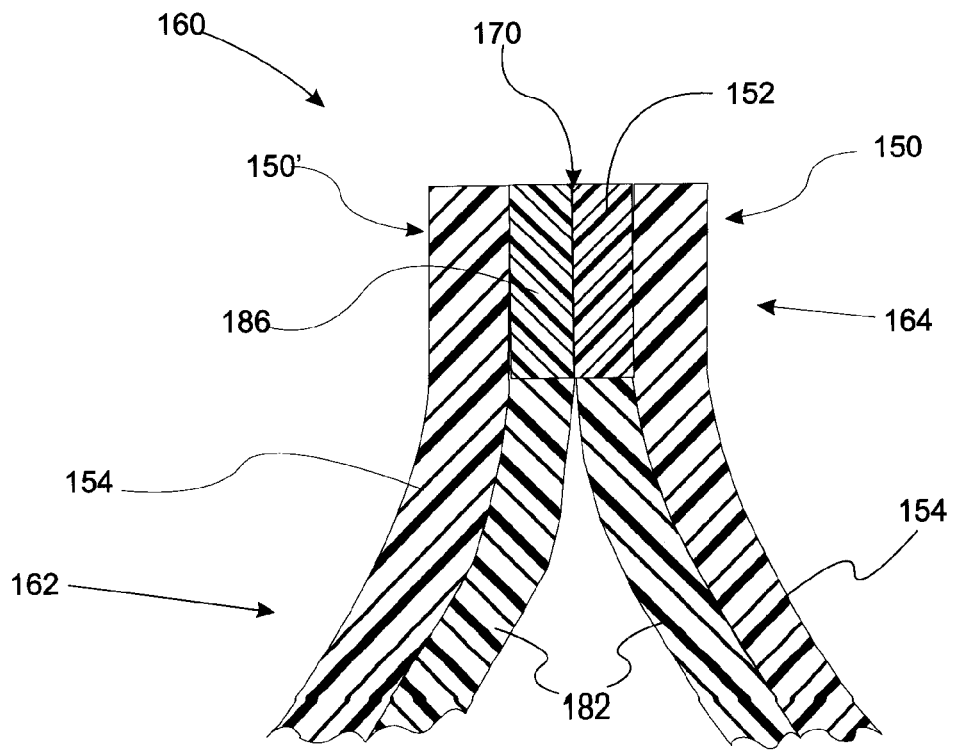
FIG. 4B is a schematic cross-section of a refinement in which sealing substrate 160 includes second sealing layer 170 with peelable seal 162 being formed between first sealing layer 152 and second sealing layer 186.

With reference to FIGS. 4A and 4B, variations of peelable sealing section 164 as used in a pouch-like packaging systems are illustrated. FIG. 4A is a schematic cross-section of a refinement in which sealing layer 152 is substantially confined to the vicinity of peelable sealing section 164. This variation is achieved by either confining the incorporation of organoclay or by depositing a distinct layer in the vicinity of sealing structure 164. This variation further includes inner layer 182 and one or more additional layer 154. FIG. 4B is a schematic cross-section of a refinement in which packaging system 160 includes second sealing layer 186 with peelable seal 170 being formed between first sealing layer 152 and second sealing layer 186. In this latter refinement, sealing layer 152 extends minimally, if at all, into container section 162. Moreover, in this refinement, container section 162 optionally includes liner layer 182 which is different than first sealing layer 152. In a further refinement of this variation, sealing section 164 further includes one or more additional polymer layer(s) 154 disposed over first sealing layer 152 and/or second sealing layer 186. In a particularly useful example of this refinement, one or more additional polymer layer(s) 154 at least partially form container section 162.

Figure 5A:
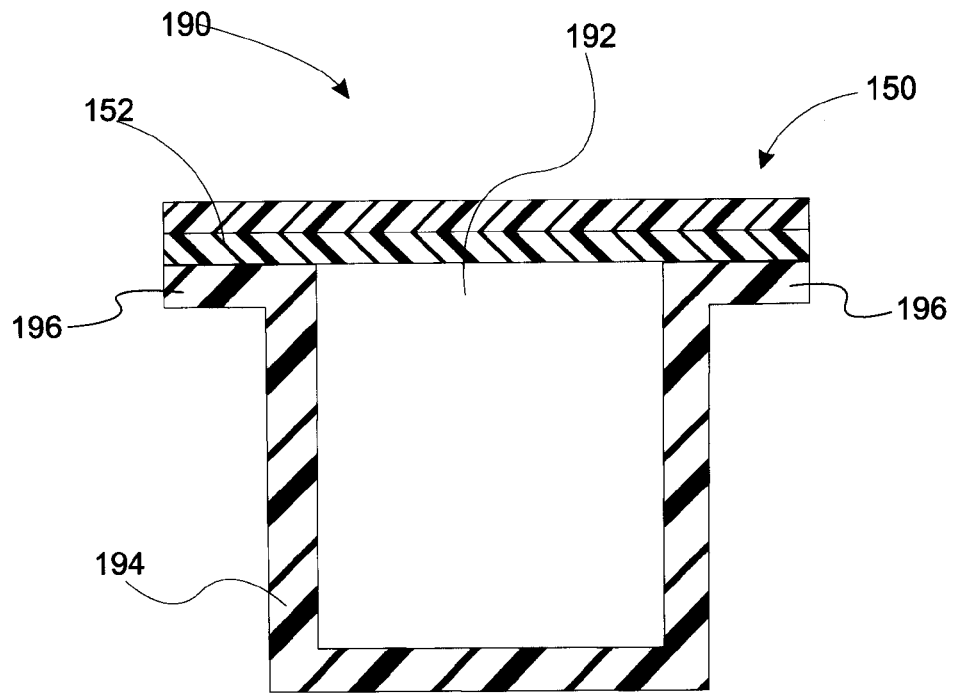
FIG. 5A is a schematic cross-section of a cup-like packaging system that uses the peelable sealing structures of the invention.
Figure 5B:
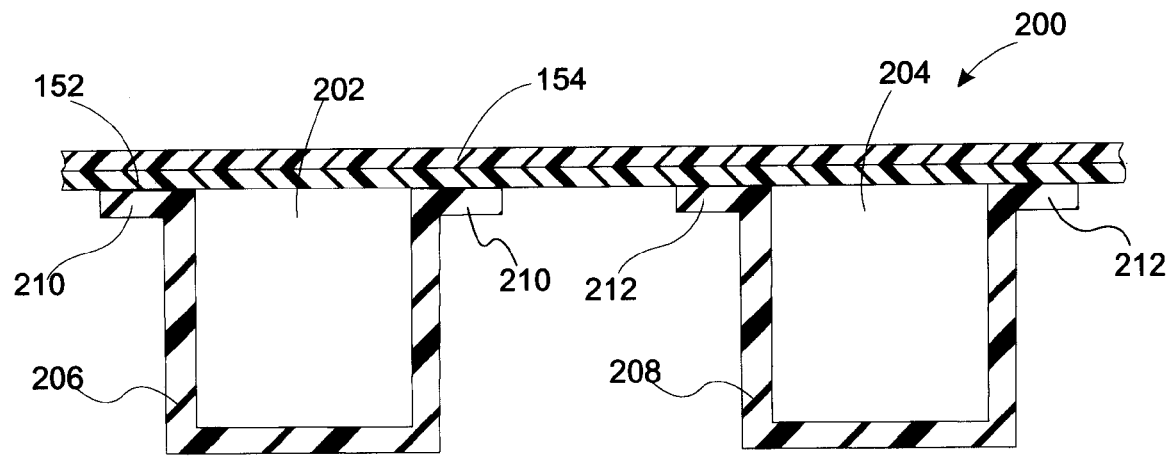
FIG. 5B is a schematic cross-section of a blister packaging system that uses the peelable sealing structures of the invention and incorporates multiple cup-like containers.

With reference to FIGS. 5A and 5B, variations of packaging systems using the peelable sealing structures of the invention with rigid container sections are illustrated. FIG. 5A provides a schematic cross-section of a cup-like packaging system that uses the peelable seeling structures of the invention. Packaging system 190 includes peelable sealing structure 150 and sealing opening 192 of container section 194. A peripheral portion of peelable sealing structure 150 is disposed over and contacts substrate section 196 of container section 194. FIG. 5B provides a schematic cross-section of a blister packaging system that incorporates multiple cup-like containers. Blister packaging system 200 includes peelable sealing structure 152 and sealing openings 202, 204 of container sections 206, 208. A portion of peelable sealing structure 152 is disposed over and contacts substrate sections 210, 212 of container sections 206, 208.

As set forth above, the peelable sealing structures of the various embodiments of the invention include an additive such as organoclays. Examples of useful organoclays include, but are not limited to, kaolinite, montmorillonite-smectite clays, bentonite clays, illite clays, and combinations thereof. U.S. Pat. Nos. 5,780,376, 5,739,087, 6,034,163, and 5,747,560 provide specific examples of nanoclays that are useful in practicing the present invention. The entire disclosure of each of these patents is hereby incorporated by reference. In one refinement of the present invention, the organoclay is present in an amount from 1 wt % to 20 wt % of the combined weight of the thermoplastic polymer and the organoclay. In another refinement of the present embodiment, the organoclay is present in an amount from 2 wt % to 10 wt % of the combined weight of the thermoplastic polymer and the organoclay.

The organoclay used in peelable sealing layer 152 typically comprises a plurality of particles. In one variation, the organoclay comprises a plurality of particles having at least one spatial dimension less than 200 nm. In another variation, the organoclay comprises a plurality of particles having at least one spatial dimension less than 100 nm. In another variation, the organoclay comprises a plurality of particles having at least one spatial dimension less than 50 nm. In still another variation, the organoclay comprises a plurality of particles having spatial dimensions greater than or equal to 1 nm. In still another variation, the organoclay comprises a plurality of particles having spatial dimensions greater than or equal to 5 nm. In another variation, the organoclay comprises platelets having an average separation of at least 20 angstroms. In yet another variation, the organoclay comprises platelets having an average separation of at least 30 angstroms. In still another variation, the organoclay comprises platelets having an average separation of at least 40 angstroms. Typically, before combining with the thermoplastic polymer, the organoclay comprises platelets having an average separation between from 20 to 45 angstroms. Advantageously, upon combining with the thermoplastic, the organoclay remains in this exfoliated state such that the average separation is maintained or increased.

As set forth above, peelable sealing layer 152 also includes a thermoplastic polymer. Suitable thermoplastic polymers include, but are not limited to, nylons, polyolefins, polystyrenes, polyesters, polycarbonates, and mixtures thereof. In a variation, the thermoplastic polymer comprises a component selected from the group consisting of ethylene acrylic acid, ethylene ethyl acrylate, ethylene ionomers (e.g., the Surlyn® line of resins available from E.I. du Pont de Nemours and Company), and combinations thereof. Polyolefins are particularly useful thermoplastic polymers in the practice of the invention. In one variation, the polyolefin is selected from the group consisting of homopolymers and copolymers of ethylene, propylene, vinyl acetate, and combinations thereof. A blend of polyolefins with ethylene vinyl acetate ("EVA") is found to be particularly useful in forming peelable seals especially when the additive is an organoclay.

The container sections of the various embodiments of the invention are formed from virtually any material used for packaging. Such materials include, but are not limited to, paper, metal foil, polymeric sheets, metalized polymeric sheets, and combinations thereof. More specific examples include, oriented or non-oriented polyester, oriented or non-oriented polypropylene, oriented or non-oriented nylon, and combinations thereof. Each of these materials may be coated or uncoated. Examples of useful coatings include, but are not limited to, varnishes, lacquers, adhesives, inks, and barrier materials (i.e., PVDC). Useful materials for packaging medical devices include high density polyolefins. Tyvek® (a synthetic material made of high-density polyethylene fibers) commercially available from Dupont, Inc. is an example of a such a material used for packaging medical devices.

Figure 6:
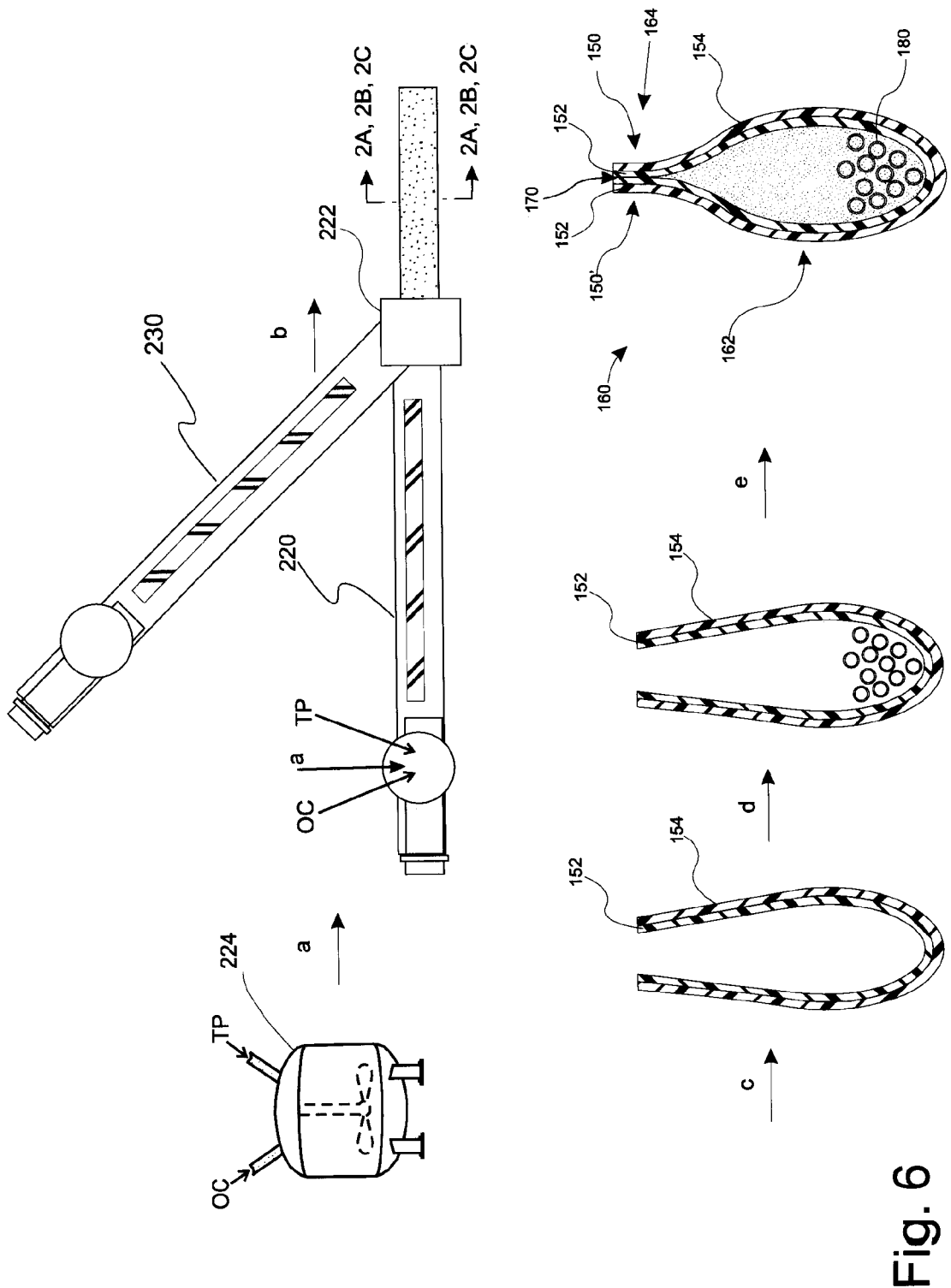
FIG. 6 is a diagram illustrating a method of forming the packaging systems of the invention.

In yet another embodiment of the present invention, a method of forming the packaging systems set forth above is provided. With reference to FIG. 6, a diagram illustrating the method of this embodiment is provided. A thermoplastic polymer ("TP") is combined with an organoclay ("OC") to form an organoclay-polymer blend ("OCB") in step a). In one variation, this combining Occurs in extruder 220. Sealing layer 152 is then formed by extrusion from die 222 in step b) from the organoclay-polymer blend. In a variation, additional layer are formed by providing material from additional extruders (such as extruder 230) to die 222. In a refinement of the present embodiment, the thermoplastic polymer and the organoclay are pre-mixed in mixer 224 and then introduced into extruder 220. Typically, sealing layer 152 will be formed along with or onto one or more additional layers 154, 156 (as shown in FIG. 2). Opened packaging system 160 is then formed in step c). This process may include steps in which the sides are sealed to produce the pouch structures of FIGS. 3-4. In a variation, the formation of opened packaging system 160 occurs during step b).

In a variation of the present embodiment, a thermoplastic polymer is combined with an organoclay by mixing a master batch with a neat polymer. In this variation, the master batch comprising the organoclay and at least a portion of the thermoplastic polymer. In this refinement, the master batch typically includes from 10 to 80 wt % organoclay.

The step of forming sealing layer 152 is accomplished by any method capable of producing layers or films from thermoplastic compositions. Examples or such methods include, but are not limited to, extrusion, co-extrusion, blow molding, casting, extrusion blow molding, and film blowing.

Still referring to FIG. 6, the method of the present embodiment optionally further comprises placing object(s) 180 within open packaging system 160 (step d). Typically, object(s) 180 reside within container section 162. After object(s) 180 are placed within container section 162, sealing layer 152 is contacted with a sealing substrate (i.e., sealing structure 150') during step e) to form a seal. Sealing may be accomplished by any number of sealing methods known in the art. Examples, include, but are not limited to, conduction heat sealing, ultrasonic sealing, and induction sealing.

The following examples illustrate the various embodiments of the present invention. Those skilled in the art will recognize many variations that are within the spirit of the present invention and scope of the claims.

Figure 7A:
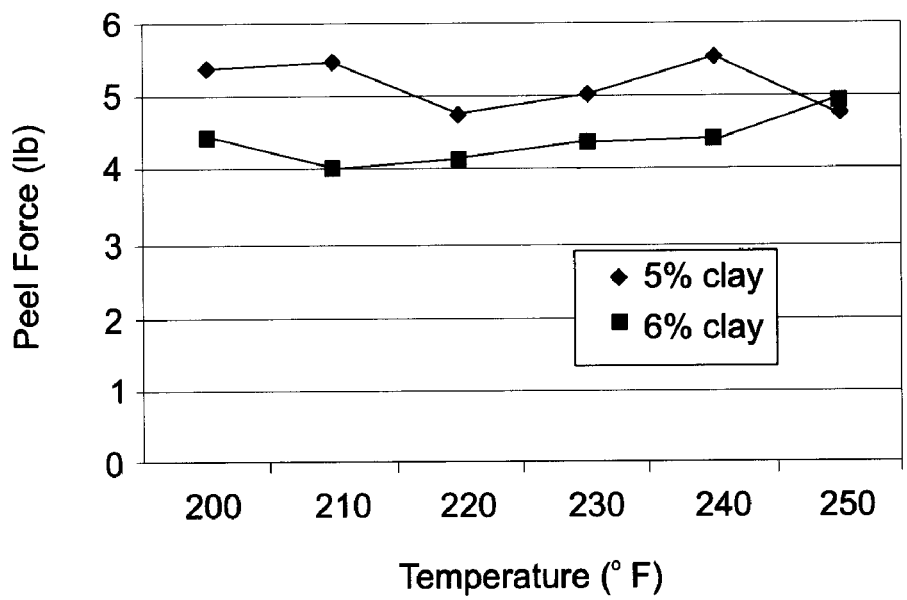
FIG. 7A provides plots of the peel force versus temperature for a top seal formed from a sealing layer having 5 wt % and 6 wt % organoclay.
Figure 7B:
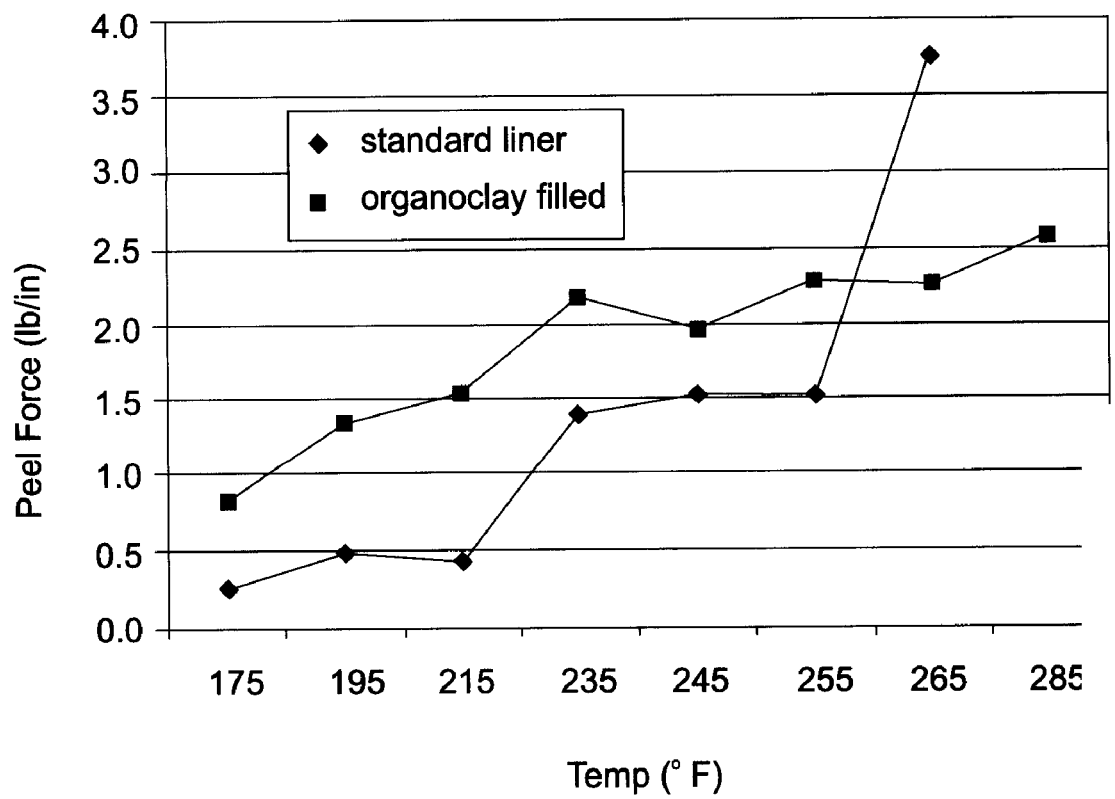
FIG. 7B provides plots of the peel force versus temperature for seals made by the three layer co-extrusion of HDPE, EVOH, and a blend of LLDPE and EVA with and without added organoclay.
Figure 7C:
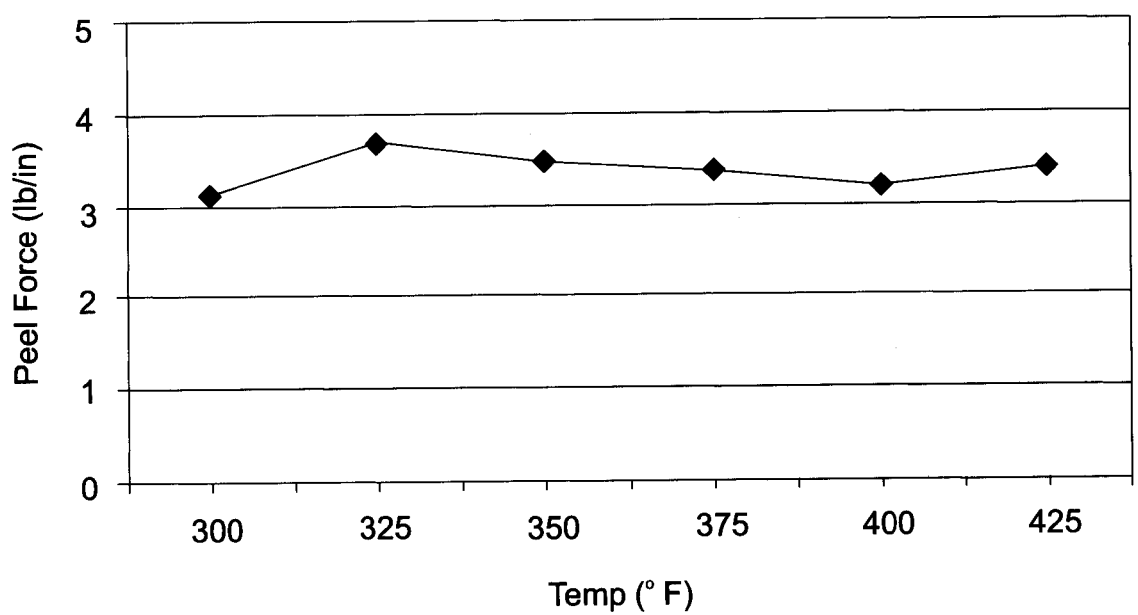
FIG. 7C provides a plot of the peel force versus seal formation temperature for a seal made from a foil laminated to a sealing film.

FIG. 7A provides plots of the peel force versus temperature for a seal formed from a sealing layer made from a co-extruded HDPE and a LLDPE/EVA and organoclay blend (i.e, a bi-layer). In these experiments, the seal of a sealed bag is pulled apart. Plots for organoclay loadings of 5 and 6 wt % are provided. FIG. 7A demonstrates that the seals of the invention can be opened by a consistent opening force over a seal forming temperature range of 50° F. degrees. Moreover, the seal strength is observed to be peelable and relatively flat over the temperature range 200° F. to 250° F. FIG. 7B provides plots of the peel force versus seal formation temperature. Plots for a reference without organoclay and for a test sample with 5 wt % organoclay are provided. The reference sample consisted of a 2.4 mil film formed from a three layer coextrusion of high density polyethylene ("HDPE"), ethylene vinyl alcohol, linear low density polyethylene ("EVOH"), and a blend of ethylene vinyl acetate blend and LLDPE. The test sample consisted of a 2.4 mil film formed from a three layer coextrusion of HDPE, EVOH, and a blend of LLDPE EVA and 5 wt % organoclay. The reference and test samples were sealed in a Sentinal sealer. Peel force is determined in accordance with ASTM F-88. The seal time for the points in FIG. 7B is 0.50 sec and the seal jaw pressure is 30 PSI. It is observed that the variation of the peel force over the temperature range 175° F. to 265° F. varied less for the sample with organoclay. Moreover, the seal formed with organoclays is peelable over that entire range of seal formation. FIG. 7C provides a plot of the peel force versus seal formation temperature for a seal made from a foil laminated to a sealing film. In this experiment, 48 ga PET/50 ga Foil is adhesively laminated to 3.2 mil test film. The test film is made from a LDPE/LLDPE/organoclay blend. The seal is made to a film of the same construction. The reference and test samples are sealed in a Sentinal sealer with peel force being determined in accordance with ASTM F-88. FIG. 7C clearly show a consistent peelable seal being formed at temperatures from 300° F. to 425° F.

Nanoblend™ MB 2001 or Nanoblend™ M MB 2101 ("master batches") is mixed with a commercial polyethylene ("PE") blend pouch sealant in a single-screw extruder with the sealant layer of the invention formed in a second film blowing operation. The tensile properties of the resulting films are evaluated in accordance to ASTM D638 (Table 1) with a test speed of 50 mm/min. Prior to testing, all samples are annealed for 21 days at 30° C. Films that include an organoclay are found to have a higher modulus than films without organoclay without sacrificing strength or max. elongation. The increase in modulus being 75% for 3 wt % organoclay, 150% for 6 wt % organoclay, and 240% for 9 wt % organoclay.

TABLE 1

Tensile properties of films formed with no added organoclay and various amounts of organoclay.

| | | Tensile Modulus (MPa) | Tensile Strength (MPa) | Elongation at break (%) |
|---|---|---|---|---|
| | unfilled (0% Clay) | 306 (±15) | 24 (±1) | 324 (±11) |
| | unfilled-TS* (0% Clay) | 329 (±5) | 24 (±1) | 291 (±5) |
| 2001 | 3% Clay | 587 (±9) | 23 (±1) | 325 (±11) |
| | 6% Clay | 825 (±17) | 24 (±1) | 396 (±6) |
| | 9% Clay | 1129 (±25) | 23 (±1) | 295 (±23) |
| 2101 | 3% Clay | 581 (±32) | 22 (±1) | 316 (±17) |
| | 6% Clay | 842 (±33) | 25 (±1) | 400 (±1) |
| | 9% Clay | 1106 (±66) | 22 (±1) | 294 (±13) |

*Unfilled-TS: Twin-screw extruded pure PE

Table 2 summarizes the results of VICAT Heat Deflection Testing. The Vicat Softening Temperature is observed to increase with increasing organoclay content with a sample having 9 wt % nanoclay exhibiting a 23° C. increase in softening temperature. The data of Table 2 implies that crystallinity is substantially uneffected by the addition of organoclay to the polyethylene sealant composition.

TABLE 2

Vicat Softening Temperature as a function of organoclay content.

| Composition | HDT (° C.) |
|---|---|
| unfilled (0% clay) | 64.5 |
| 3% by Nano2001 | 70.5 |
| 6% by Nano2001 | 80.9 |
| 9% by Nano2001 | 87.0 |
| 3% by Nano2101 | 70.5 |
| 6% by Nano2101 | 80.5 |
| 9% by Nano2101 | 87.0 |

Figure 8:
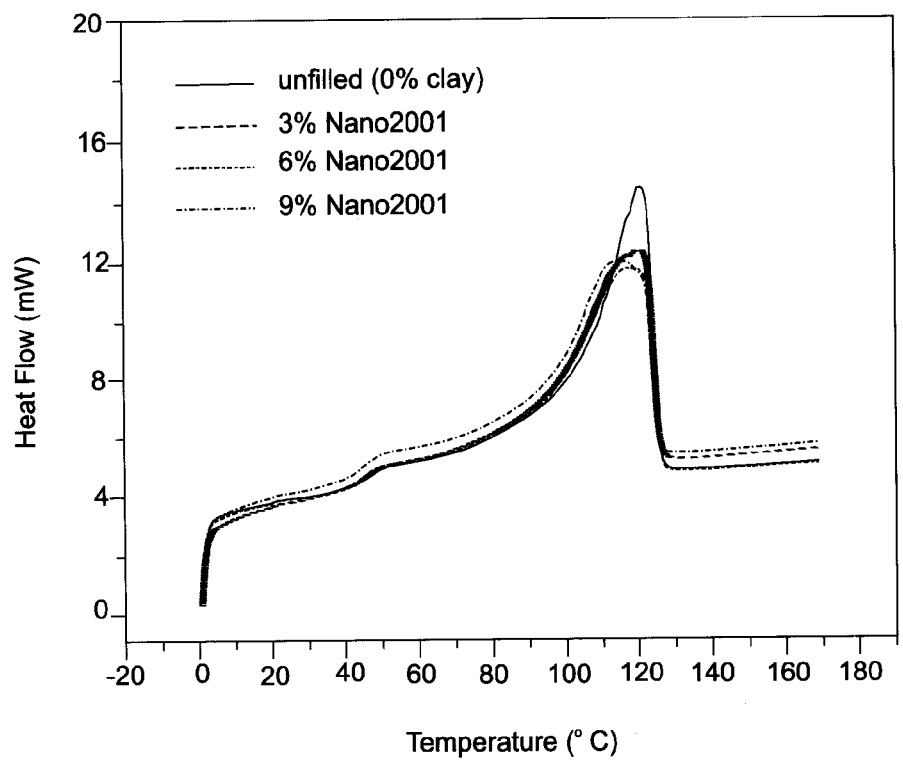
FIG. 8 is a series of plots for determining the melting temperature ("Tm")
Figure 9:
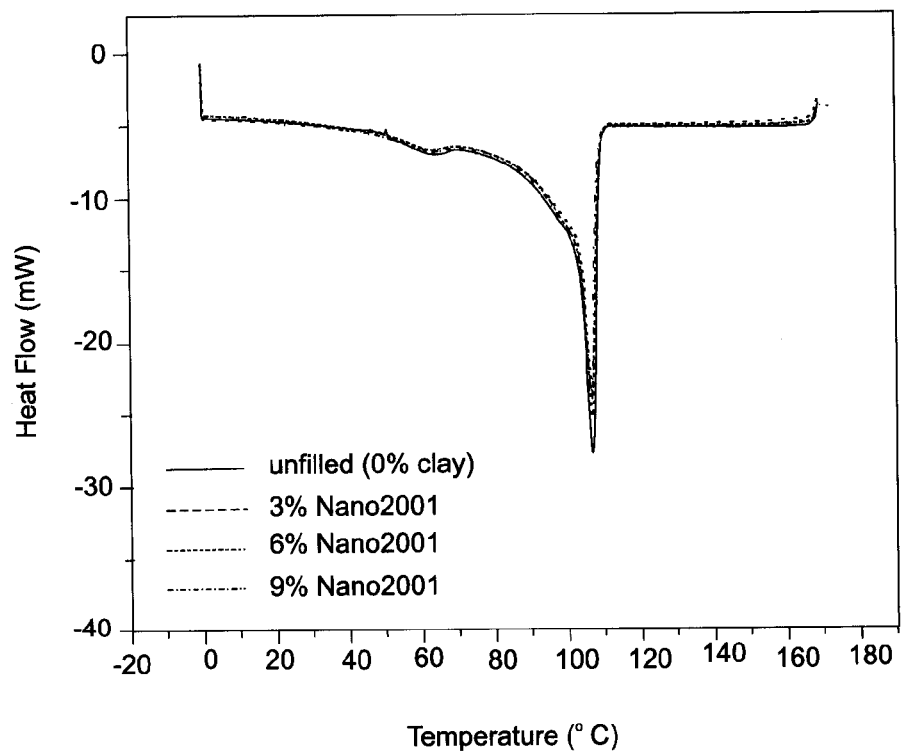
FIG. 9 is a series of plots for determining the crystallization temperature ("Tc")
Figure 10A:
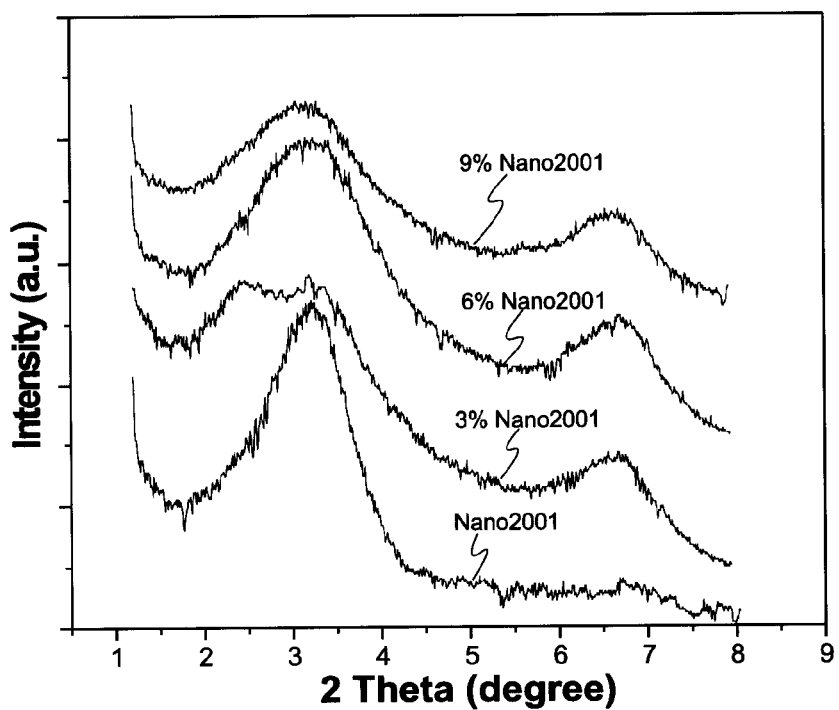
FIG. 10A is a set of x-ray diffraction plots showing the dispersion of organoclay from Nanoblend 2001 within a sealing layer comprising polyethylene.
Figure 10B:
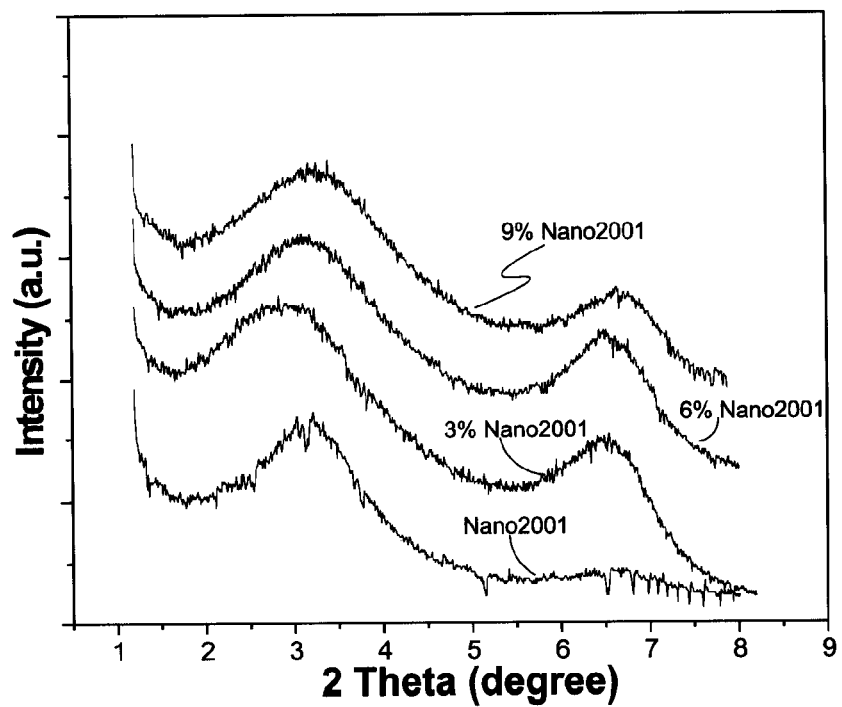
FIG. 10B is a set of x-ray diffraction plots showing the dispersion of organoclay from Nanoblend 2101 within a sealing layer comprising polyethylene.

Crystallization temperature and melting temperature are also evaluated. These measurements are performed by measuring the enthalpies of fusion and crystallization in accordance with ASTM D 3417. FIG. 8 provides plots for determining the melting temperature ("Tm") while FIG. 9 provides plots for determining the crystallization temperature ("Tc") for layers containing varying amounts of Nanoblend™ MB 2001. Tm and Tc are observed to be substantially uneffected by the addition of nanoclay as compared to a pure polyethylene sample. FIG. 10A provides a set of x-ray diffraction plots showing the dispersion of organoclay from Nanoblend 2001 within a sealing layer comprising polyethylene. FIG. 10B provides a set of x-ray diffraction plots showing the dispersion of organoclay from Nanoblend 2101 within a sealing layer comprising polyethylene. The x-ray diffraction data demonstrates the mean separation of organoclay platelets is preserved (i.e., minimal agglomeration). Such preservation of separation allows for the achieved properties regarding peelability, tensile strength, HDT, and the elongation of break of embodiments of the present invention.

Tables 3 and 4 provide surface roughness measurements for sealing layers formed by the present invention. In these examples, a coextruded bi-layer is formed. The smoother side is from an HDPE layer not having organoclay. The rougher side is a LLDPE/EVA layer having organoclay. The organoclay-containing layers of the present invention are found to have a higher degree of roughness than analogous samples not having organoclay. Moreover, the sample having 6 wt % organoclay has a greater amount of surface roughness than the sample having 5 wt % organoclay thereby showing that the amount of surface roughness tends to increase in the range of about 10% or less.

TABLE 3

Smoother side of the bi-layer sample having 5 wt % organoclay in the sealant layer

| | Scan speed(μm/S), vertical range (um) | | | |
|---|---|---|---|---|
| | 10, 13 | 50, 13 | 10, 1048 | 50, 1048 |
| Average roughness (Ra)/A° | 2406 | 2428 | 2343 | 2303 |
| Maximum roughness (Mas Ra)/A° | 2538 | 2617 | 2343 | 2279 |
| Roughness (RMS)/A° | 2991 | 3040 | 2857 | 3096 |

TABLE 4

Rougher side of the bi-layer sample having 5 wt % organoclay in the sealant layer

| | Scan speed (μm/S), vertical range (um) | | | |
|---|---|---|---|---|
| | 10, 13 | 50, 13 | 10, 1048 | 50, 1048 |
| Average roughness ($R_A$)/A° | 6217 | 5413 | 5871 | 5979 |
| Maximum roughness (Max $R_a$)/A° | 5059 | 4499 | 5775 | 5741 |
| Roughness (RMS)/A° | 7947 | 6917 | 7571 | 7648 |

TABLE 5

Smoother side of the bi-layer sample having 6 wt % organoclay in the sealant layer

| | Scan speed(μm/S), vertical range (um) | | | |
|---|---|---|---|---|
| | 10, 13 | 50, 13 | 10, 1048 | 50, 1048 |
| Average roughness (Ra)(A°) | 2564 | 2275 | 3110 | 3210 |
| Maximum roughness (Max $R_a$) (A°) | 1994 | 1762 | 2333 | 2543 |
| Roughness (RMS) (A°) | 3351 | 2999 | 3843 | 3445 |

TABLE 6

Rougher side of the bi-layer sample having 6 wt % organoclay in the sealant layer

| | Scan speed (μm/S), vertical range (um) | | | |
|---|---|---|---|---|
| | 10, 13 | 50, 13 | 10, 1048 | 50, 1048 |
| Average roughness ($R_a$) (A°) | 7069 | 6935 | 7974 | 6897 |
| Maximum roughness (Max $R_a$) (A°) | 8081 | 6977 | 6600 | 6412 |
| Roughness (RMS)/A° | 9100 | 8990 | 9955 | 8951 |

Figure 11:
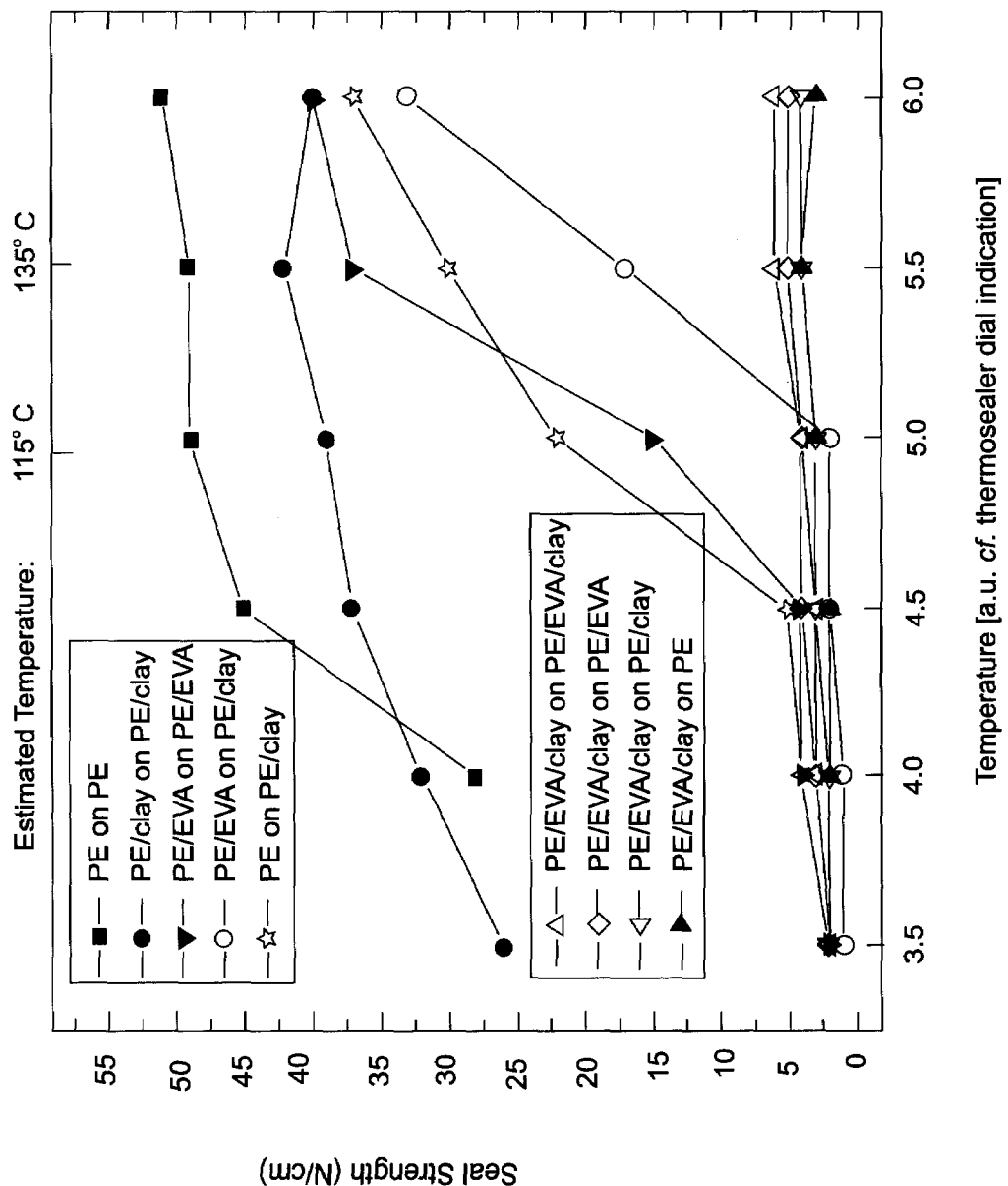
FIG. 11 provides plots of seal strength versus seal formation temperature for seals made by an impulse sealer.

FIG. 11 provides plots of seal strength versus seal formation temperature. In these experiments an impulse sealer is used for forming the seals. In such sealers the temperature is set by a dial position. FIG. 11 provides the seal strength as a function of dial position. Estimated temperatures are provided at the top of FIG. 11. FIG. 11, again, demonstrates the synergistic effect of the combination polyethylene, EVA, and organoclay with seals formed from this combination being peelable over a wide seal formation temperature range.

Figure 12A:
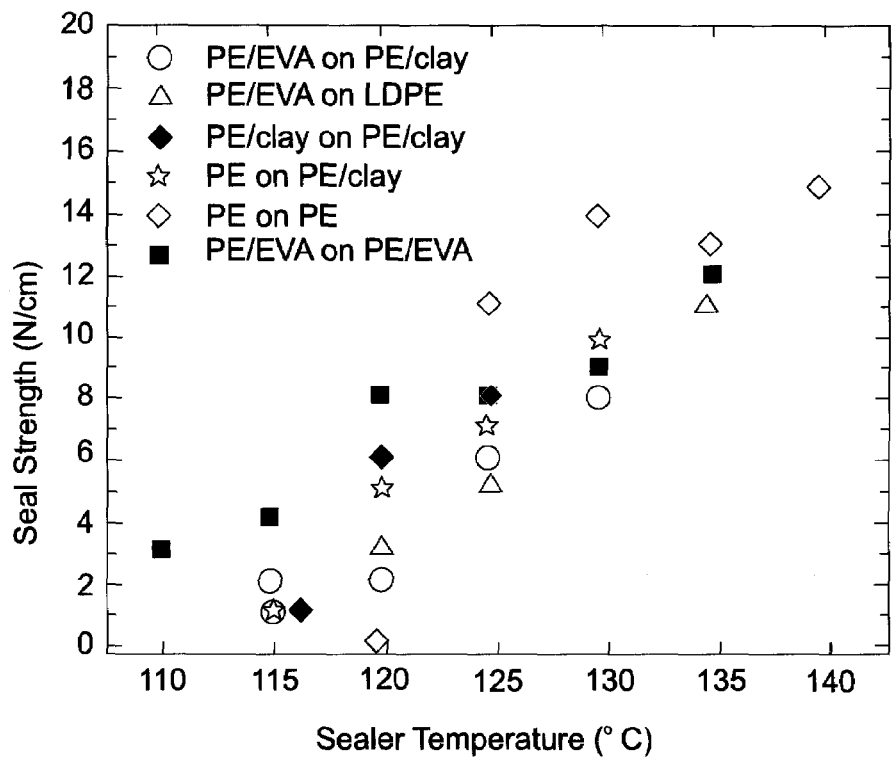
FIG. 12A provides plots of seal strength versus seal formation temperature for seals made from polyethylene or a blend of polyethylene and EVA inside by a conduction sealing method.
Figure 12B:
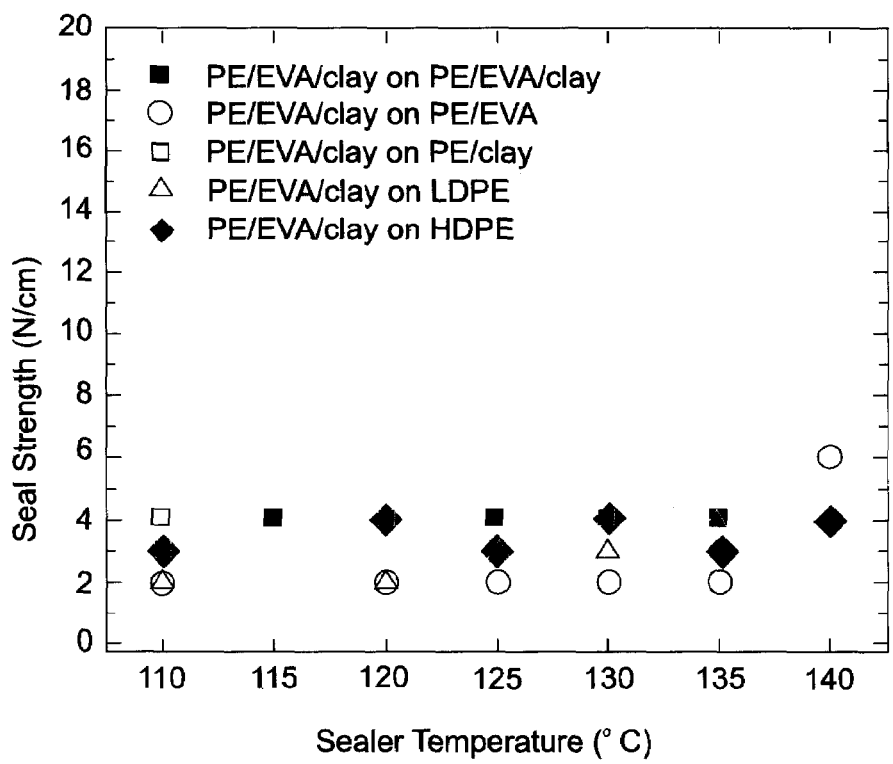
FIG. 12B provides plots of seal strength versus seal formation temperature for seals in which at least one of the sealing layers includes a blend of polyethylene, EVA, and organoclay.

A series of 25.4 mm seals are made at a pressure of about 1000 psi with a sealing time of about 8 seconds. In these experiments a hydraulic press is used. Although these conditions are harsher than the conditions used in typical commercial scaling operations, the formations of peelable seals at these conditions further illustrates the ability of the formulations of the present invention to form peelable seal. FIGS. 12A and 12B provides plots of the seal strength versus seal formation temperature for various combinations of seal layers. In these experiments a seal is formed between a first sealing layer and a second sealing layer. In FIG. 12A each sealing layer includes polyethylene or a blend of polyethylene and EVA. In general, the seal strength increases with increasing temperature for these combinations over the temperature range 110° C. to 140° C. In FIG. 12B, at least one of the scaling layers includes a blend of polyethylene, EVA, and organoclay. For seals formed in this manner, FIG. 12B illustrates the formation of peelable seals over a temperature range from 110° C. to 140° C. FIGS. 13A and 13B provide Table 6 which summarizes the seal strength data for FIGS. 12A and 12B while characterizing the type of failure mode (see FIGS. 1A-1G). Table 6 clearly shows the formation of peelable seals over a wide range of temperatures.

Figure 14A:
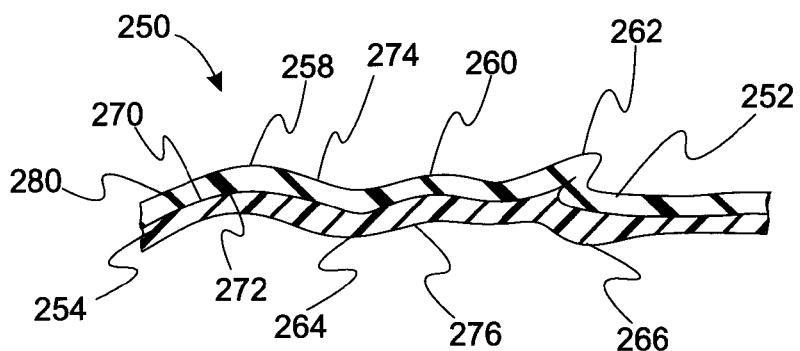
FIG. 14A is schematic cross-sections illustration of peelable seals having one or more folds therein.
Figure 14B:
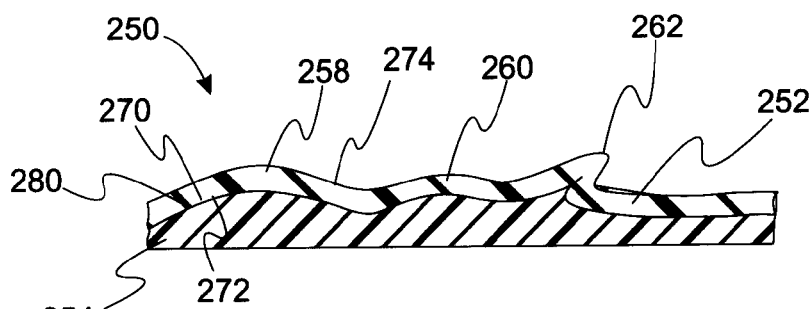
FIG. 14B is schematic cross-sections illustration of peelable seals having one or more folds therein.

In still another embodiment of the present invention, a peelable seal adapted to provide a leak-proof seal having one or more wrinkles incorporated therein is provided. With reference to FIGS. 14A and 14B, schematic cross-sections illustration of peelable seals incorporating one or more folds are provided. Peelable seal 250 includes first sealing layer 252 and second sealing layer 254. First sealing layer 252 include bends 258, 260 and fold 262. Similarly, second sealing layer 254 includes bends 264, 266. First layer sealing layer 252 includes first sealing surface 270 while second sealing layer 254 includes second sealing surface 272. Outer sealing surfaces 274, 276 are attached to additional layers as set forth above in connection with the descriptions of FIGS. 1-5. First sealing surface 270 contacts the second sealing surface 272 to form seal 280. FIG. 14B provides an illustration in which second sealing layer 254 includes minimal bends or folds.

The details of the composition of sealing layers 252 and 254 are the same as those set forth above. In particular, at least one of the first sealing layer 252 and second sealing layer 254 include a thermoplastic polymer and an additive dispersed within the thermoplastic polymer. In a variation, the additive is present in a sufficient amount to form peelable seal 280 between the first sealing layer 252 and second sealing layer 254 at all temperatures within a peelable seal temperature range. As set forth above, in a refinement, the peelable seal temperature range is from a seal initiation temperature to a temperature that is at least 100 F. degrees above the seal initiation temperature. In a particularly useful variation, the additive is an organoclay dispersed within at least a portion of the thermoplastic polymer. In such a variation, one or both of first sealing layer 252 and second sealing layer 254 have a seal initiation temperature from about 170° F. to about 350° F. Additional details for the additive, the organoclay and the thermoplastic polymer are set forth above.

Figure 15:
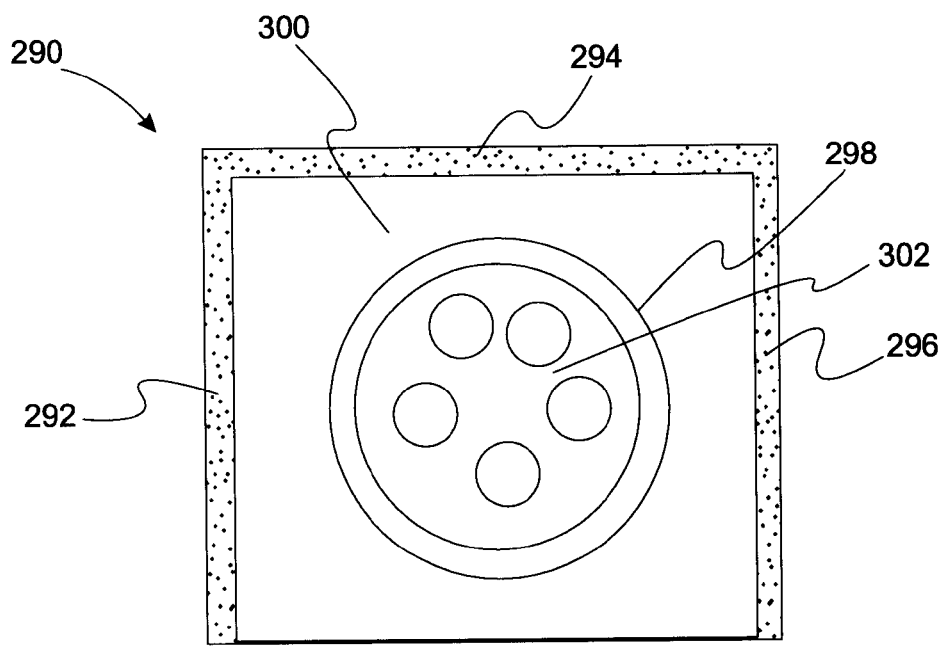
FIG. 15 is a top view of a packaging system that has folds or bends incorporated within the seals.

With reference to FIG. 15, a top view of a packaging system that tends to have folds or bends incorporated within the seals is provided. Package 290 includes peelable seals 292, 294, 296. It should be appreciated that packaging with only one or two side halving a peelable seal are also possible. Package 290 is depicted as containing food item 298. The presence of food item 298 within container section 300 during the packaging process causes a lifting of container wall 302. This lifting of container wall 302 induces the formation of bends and fold within peelable seals 292, 294, 296 as set forth in connection with the descriptions of FIGS. 14A and 14B. Packages such as those depicted in FIG. 15 are found to have a reduced incidence of leaks. For example, oxygen levels in a package using the organoclay compositions set forth above are found to be on average lower than a commercially available sealing composition. Moreover, test with liquids containing dyes are also found to have low incidence of leaks.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A peelable seal comprising:
a first sealing layer having a first sealing surface;
a second sealing layer having a second sealing surface, the first sealing surface contacting the second sealing surface to define a seal such that one or both of the first and second sealing layers have one or more wrinkles or pleats incorporated therein, wherein at least one of the first and second sealing layers include:
a polyolefin polymer; and
an exfoliated organoclay dispersed within at least a portion of the polyolefin polymer, wherein at least one of the first and second sealing layers has a seal initiation temperature from about 170° F. to about 350° F. and at least one of the first and second sealing layers has a tensile modulus from about 500 to about 2000 MPa, the organoclay comprising platelets having an average separation of at least 20 angstroms and the sealing surface having a roughness average from about 1500 to about 5000 angstroms.

2. The peelable seal of claim 1 wherein the organoclay comprises a plurality of particles having a spatial dimension less than 200 nm.

3. The peelable seal of claim 1 wherein the organoclay comprises a clay selected from the group consisting of kaolinite, montmorillonite-smectite clays, bentonite clays, illite clays, and combinations thereof.

4. The peelable seal of claim 1 wherein the organoclay is present in an amount from 1 wt % to 20 wt % of the combined weight of the polyolefin polymer and the organoclay.

5. The peelable seal of claim 1 wherein the organoclay is present in an amount from 2 wt % to 10 wt % of the combined weight of the polyolefin polymer and the organoclay.

6. The peelable seal of claim 1 wherein at least one of the first and second sealing layers further includes a component selected from the group consisting of nylons, polystyrenes, polyesters, polycarbonates, copolymers of ethylene, copolymers of propylene, ethylene vinyl acetate, and mixtures thereof.

7. The peelable seal of claim 1 wherein at least one of the first and second sealing layers further includes a component selected from the group consisting of ethylene acrylic acid, ethylene ethyl acrylate, ethylene ionomers, and combinations thereof.

8. The peelable seal of claim 1 wherein at least one of the first and second sealing layers further includes ethylene vinyl acetate.

9. A peelable seal comprising:
a first sealing layer having a first sealing surface;
a second sealing layer having a second sealing surface, the first sealing surface contacting the second sealing surface to define a seal such that one or both of the first and second sealing layers have one or more wrinkles or pleats incorporated therein, wherein at least one of the first and second sealing layers include:
a polyolefin polymer; and
an exfoliated organoclay dispersed within the polyolefin polymer, the exfoliated organoclay being present in a sufficient amount to form a peelable seal between the first and second sealing layers at all temperatures within a peelable seal temperature range, the peelable seal temperature range being from a seal initiation temperature to a temperature that is at least 100 F degrees above the seal initiation temperature wherein at least one of the first and second sealing layers has a seal initiation temperature from about 170° F. to about 350° F. and at least one of the first and second sealing layers has a tensile modulus from about 500 to about 2000 MPa, the organoclay comprising platelets having an average separation of at least 20 angstroms and the sealing surface having a roughness average from about 1500 to about 5000 angstroms.

* * * * *